United States Patent
Abdelaal

(10) Patent No.: US 12,298,948 B2
(45) Date of Patent: May 13, 2025

(54) SYSTEMS AND/OR METHODS FOR REINFORCED DATA CLEANING AND LEARNING IN MACHINE LEARNING INCLUSIVE COMPUTING ENVIRONMENTS

(71) Applicant: SOFTWARE GmbH, Darmstadt (DE)

(72) Inventor: Mohamed Osman Mohamed Abdelaal, Stuttgart (DE)

(73) Assignee: SOFTWARE GmbH, Darmstadt (DE)

( * ) Notice: Subject to any disclaimer, the term of this patent is extended or adjusted under 35 U.S.C. 154(b) by 0 days.

(21) Appl. No.: 18/134,913

(22) Filed: Apr. 14, 2023

(65) Prior Publication Data
US 2024/0346002 A1    Oct. 17, 2024

(51) Int. Cl.
*G06F 16/215*    (2019.01)

(52) U.S. Cl.
CPC ................... *G06F 16/215* (2019.01)

(58) Field of Classification Search
None
See application file for complete search history.

(56) References Cited

U.S. PATENT DOCUMENTS

| | | | | |
|---|---|---|---|---|
| 2012/0296879 | A1* | 11/2012 | Yakout | G06F 16/215 707/E17.005 |
| 2021/0383170 | A1* | 12/2021 | Alshawabkeh | G06F 18/24323 |
| 2022/0207007 | A1* | 6/2022 | Solanki | G06F 16/24553 |

OTHER PUBLICATIONS

P. Li, X. Rao, J. Blase, Y. Zhang, X. Chu and C. Zhang, "CleanML: A Study for Evaluating the Impact of Data Cleaning on ML Classification Tasks," Apr. 19-22, 2021, IEEE 37th International Conference on Data Engineering (ICDE), pp. 13-24. (Year: 2021).*
"How to Improve Your Data Quality," Jul. 14, 2021, Contributor: Manasi Sakpal, Gartner, pp. 1-10.
Krishnan et al., "ActiveClean: Interactive Data Cleaning For Statistical Modeling," vol. 9, No. 12, 2016, pp. 1-12.
Minh et al., "Automated Image Data Preprocessing with Deep Reinforcement Learning," Apr. 29, 2021, pp. 1-9.
Krishnan et al., "BoostClean: Automated Error Detection and Repair for Machine Learning," Nov. 3, 2017, pp. 1-15.
Neutatz et al., "ED2: Two-stage Active Learning for Error Detection—Technical Report," Aug. 17, 2019, pp. 1-10.
Rekatsinas et al., "HoloClean: Holistic Data Repairs with Probabilistic Inference," Feb. 2, 2017, pp. 1-13.

(Continued)

*Primary Examiner* — Kannan Shanmugasundaram
(74) *Attorney, Agent, or Firm* — Nixon & Vanderhye P.C.

(57) ABSTRACT

A reinforcement learning based approach is used for data cleaning operations that are used in data preparation operations where machine learning (ML) technology is implemented. Features are extracted from a dirty dataset. A batch is sampled from the dirty dataset. A set of one or more repair tools is selected from available repair tools, provided that the sampled batch is determined to include at least one error. The sampled batch is repaired using the selected set of repair tools. The ML model is trained based on the repaired sampled batch. A feedback metric is calculated based on performance of the trained ML model in connection with a validation dataset. The trained ML model is adjusted based on the calculated feedback metric (a loss). The approach is repeated such that the selection of the set of repair tools is modified based on the calculated feedback metric (a reward).

20 Claims, 7 Drawing Sheets

(56) References Cited

OTHER PUBLICATIONS

Laure Berti-Equille, "Learn2Clean: Optimizing the Sequence of Tasks for Web Data Preparation," May 2019, pp. 2580-2586.
Henke et al., McKinsey Global Institute, "The Age of Analytics: Competing in a Data-Driven World," Dec. 2016, pp. 1-136.
Karlas et al., "Nearest Neighbor Classifiers over Incomplete Information: From Certain Answers to Certain Predictions," May 12, 2020, pp. 1-34.
Liu et al., "Picket: Guarding Against Corrupted Data in Tabular Data during Learning and Inference," Jul. 26, 2021, pp. 1-23.
Mahdavi et al., "Raha: A Configuration-Free Error Detection System," MIT Open Access Articles, Jun.-Jul. 2019, pp. 1-19.
Sutton et al., "Reinforcement Learning: An Introduction," 2014, 2015, The MIT Press, pp. 1-352.
Williams, "Simple Statistical Gradient-Following Algorithms for Connectionist Reinforcement Learning," Machine Learning, 8, 229-256 (1992), pp. 5-32.
UCI: Machine Learning Repository, Airfoil Self-Noise Data Set, https://archive.ics.uci.edu/ml/datasets/airfoil+self+noise#.
UCI: Machine Learning Repository, Wine Quality Data Set, https://archive.ics.uci.edu/ml/datasets/wine+quality.

\* cited by examiner

| ID | Name | Age | Gender | Income | Education | Zipcode | Phone |
|---|---|---|---|---|---|---|---|
| 1 | John | 25 | Male | 50,000 | Bachelor | 90001 | (310)555-1212 |
| 2 | Jane | 30 | Female | 60,000 | Master | null | (310)555-1213 |
| 3 | Michael | 35 | Male | 75,000 | Bachelor | 90001 | 310-555-1214 |
| 4 | Ashley | 40 | Female | 80,000 | Ph.D | 90001 | 310-555-1215 |
| 5 | David | 45 | Male | 100,000 | Ph.D | 90001 | 310-555-1216 |
| 6 | Samantha | 500 | Female | 125,000 | Ph.D | 90001 | 310-555-1217 |
| 7 | Ryan | 55 | Male | 150,000 | High School | 90001 | (310)555-1218 |
| 8 | Stephanie | 60 | Female | 60,000 | Ph.D | 90001 | (310)555-1219 |
| 9 | Robrt | 65 | Male | 90,000 | Ph.D | 90001 | (310)555-1220 |
| 10 | Karen | 70 | Female | 10,000 | Ph.D | 90001 | (310)555-1221 |

Fig. 1

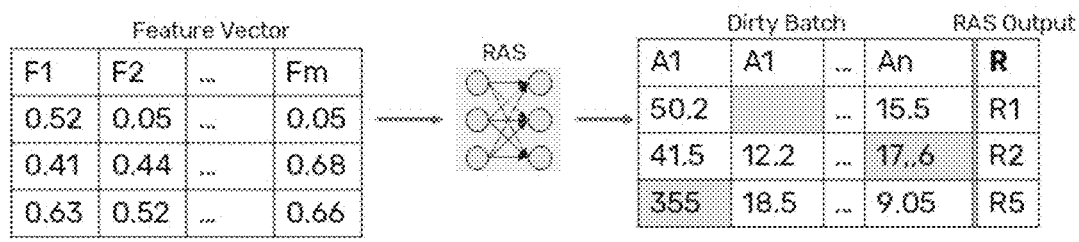

Fig. 5

| Baseline Method | Alias in Figures | Configured Parameter |
|---|---|---|
| Mean Imputer | *mean_imputer* | - |
| Median Imputer | *median_imputer* | - |
| KNN Imputer (1) | *knn_imputer_5* | number of neighbors |
| KNN Imputer (2) | *knn_imputer_20* | number of neighbors |
| KNN Imputer (3) | *knn_imputer_50* | number of neighbors |
| EM Imputer (1) | *em_imputer_50* | number of iterations |
| EM Imputer (2) | *em_imputer_100* | number of iterations |
| Bayesian Ridge Imputer | *bayesian_ridge_imputer* | - |
| MissForest Imputer (1) | *missforest_imputer_50* | number of trees in the forest |
| MissForest Imputer (2) | *missforest_imputer_100* | number of trees in the forest |
| MissForest Imputer (3) | *missforest_imputer_200* | number of trees in the forest |

Fig. 6

1: Input: Mini-batch size $B_s$, number of iterations for RL agent $N_O$, number of iterations for predictor $N_I$, dirty training dataset $\mathcal{D}^d$, validation dataset $\mathcal{D}^v$, feature vectors $\mathcal{V}^d$, moving average window $T > 0$
2: Initialize parameters $\phi, \theta$, moving average $\delta = 0$
3: for $j = 1, ..., N_O$ do
4:     Sample a mini-batch of samples from the dirty training dataset and their corresponding feature vectors: $\mathcal{D}^b = (\mathbf{x}_i, y_i)_{i=1}^{B_s}$ and $\mathcal{V}^b = (\mathcal{V}_i)_{i=1}^{B_s}$
5:     Output cleaners $C_i = h_\phi(\mathcal{V})$
6:     Apply cleaners on the samples of $\mathcal{D}^b$: $\mathcal{D}^c = (\tilde{\mathbf{x}}_i, \tilde{y}_i)_{i=1}^{B_s}$
7:     Update the parameters of predictor network
8:     for $j = 1, ..., N_I$ do

$$\theta \leftarrow \theta - \alpha \frac{1}{B_s} \sum_{i=1}^{B_s} \nabla_\theta \mathcal{L}_f(f_\theta(\tilde{\mathbf{x}}_i, \tilde{y}_i))$$

9:     end for
10:    Update the parameters of cleaner selector $$\phi \leftarrow \phi - \beta \frac{1}{B_s} \left[ \sum_{i=1}^{B_s} [\mathcal{L}_h(f_\theta(\mathbf{x}_i^v, y_i^v)) - \delta \right] \nabla_\phi \log \pi_\phi(\mathcal{V}^b)$$

Update the moving average baseline: $\delta \leftarrow \frac{T-1}{T}\delta + \frac{1}{LT}\sum_{j=1}^{K}[\mathcal{L}_h(f_\theta(\mathbf{x}_j), y_j)]$
11: end for

Fig. 7

SYSTEMS AND/OR METHODS FOR REINFORCED DATA CLEANING AND LEARNING IN MACHINE LEARNING INCLUSIVE COMPUTING ENVIRONMENTS

TECHNICAL FIELD

Certain example embodiments described herein relate to improvements to machine learning (ML) technology and improvements to computer-based tools that leverage ML technology. More particularly, certain example embodiments described herein relate to a reinforcement learning based approach to data cleaning operations that are used in data preparation operations where ML technology is implemented.

BACKGROUND AND SUMMARY

Recently, machine learning (ML) technology has been applied to a wide variety of application domains such as, for example, automotive, medical, pharmaceutical, and other domains. ML technology has had a large impact on these domains. For example, in these areas, ML technology has enabled self-driving cars, novel diagnostics, personalized treatment, and other advancements.

In such domains, and in enabling the above-noted and other advancements, ML technology typically involves the collection of different data modalities, including relational data (or relational records), sensory readings, digital images and videos, audio, and text. Relational data refers to data stored in a table or a set of tables (or equivalent computer-mediated data structures), where the data is organized in the form of rows (also sometimes referred to as records) and columns (also sometimes referred to as attributes). Examples of relational data include sensory readings, medical reports, and financial records. The collected data is usually consumed by analytics tool and platforms to draw interesting conclusions and to make informed decisions. For example, the gathered data can lead to decisions on when to have an automobile speed up or slow down to avoid a collision, when to flag a shadow as a potential tumor, when to suggest a particular course of treatment with a low likelihood of adverse interactions, etc.

It will be appreciated that the value of such decisions and conclusions is highly dependent on the quality of the data used to train and test the machine-learned models, because the performance of the machine-learned models underlying these technical solutions depends on the quality of the data used to train and test them. The performance of such analytics tools and platforms may strongly degrade when the data used for training and testing machine-learned models contains errors. Poor quality data can lead to poor model performance, inaccurate predictions, and ultimately, the failure of the ML-based application. A recent study found that poor data quality costs organizations an average of $12.9 million per year.

Unfortunately, real-world data suffers from several error types, e.g., because of improper join operations, noisy communication channels, inaccurate and/or incomplete manual data entry, etc. Such problems may lead to different error types, including outliers, pattern violations, constraint/rule violations, duplicates, typos, inconsistencies, formatting issues, mislabeling, implicit/explicit missing values, and the like. Moreover, these distinct error types may exist simultaneously in a given dataset. In this regard, many datasets have a heterogeneity of error types. A given record in a given dataset might exhibit multiple ones of these errors.

To help provide for data quality in ML-based applications, a "data pipeline" typically includes various preprocessing steps such as, for example, data cleaning, data transformation, and data validation. In this context, data cleaning (also sometimes referred to data cleansing or data curation) involves removing or correcting errors or inconsistencies in the data, such as missing values or duplicate records.

FIG. 1 is a table showing an example of a dirty dataset comprising categorical and numerical columns, and helping to explain several ways in which poor data quality may be present in a given dataset. Dirty data may be thought of as including low-quality data samples that contain one or more error types. Examples of error types include duplicates, outliers, constraint/rule violations, implicit missing values, explicit missing values, inconsistences, typographical errors, formatting issues, mislabeling, etc. In contrast with dirty data, clean data may be thought of as including high-quality data samples collected without (or corrected so as to lack) error profiles. These samples may achieve a set of application-relevant quality metrics such as completeness, accuracy, timeliness, uniqueness, and consistency. In the FIG. 1 example, the "Name" column has a typographical error ("Robrt" instead of "Robert"), and the "age" and the "income" columns include numerical outliers (i.e., an age of 500 for a human is an invalid entry, and an income of 10,000 in this example is an outlier). The "phone" column comprises several entries with improper (or at least inconsistent) formatting (i.e., where parentheticals are lacking around area codes, and where extraneous dashes are provided).

If the training data contains outliers, it can broadly skew the model's predictions. For example, if a model is trained to predict the price of a stock but the data contains an unusual outlier, the model's predictions will be negatively affected. Similarly, if the training data contains a lot of noise, it can make it difficult for a model to find patterns in the data. To efficiently tackle these quality problems, there is a trend towards automate data cleaning, which may be implemented as a part of data preparation operations. Data preparation in general refers to the preprocessing of datasets before they are used as inputs to predictive models. Data preparation, broadly speaking, may include processes such as, for example, data annotation, data cleaning, data transformations, feature extractions, and/or the like.

Bringing computer-based automation to these preparation steps has several technical advantages. One technical advantage relates to efficiency. Automating data preparation can allow for faster and more efficient processing of data, especially (although not exclusively) in projects where there is a large volume of data to be processed and trained. Moreover, through automation, the same data processing steps can be applied to new data sets, which can help to ensure that the results are reproducible.

In a related regard, another technical advantage relates to consistency. For example, automating data preparation can help ensure that data is processed in a consistent manner. This consistency can help to preserve the integrity of the data and can help ensure that the results of the ML model are accurate and reliable in the development and the deployment phases.

Another technical advantage relates to the ability to reduce human errors. Automated approaches to data cleaning can reduce the chances of human errors being introduced during data preparation process, and it also can reduce the likelihood of bias being introduced in the data. Still another technical advantage relates to time-savings, as automating data preparation can drastically save a data scientist time and resources. Accordingly, such savings can be exploited for other tasks, e.g., developing and fine-tuning of the ML model itself.

Despite the aforementioned technical advantages associated with automated data preparation techniques, they unfortunately come with their own set of technical challenges. One technical challenge relates to data preparation operations being isolated from the rest of the data pipeline. Data preparation often is handled by a different team or group of individuals compared to the model building team, which typically results in the former and the latter teams being isolated from one another. Such isolation may cause the data to be transformed in a way that is not suitable for the chosen model, thus leading to poor performance and inaccurate predictions (e.g., from a lack of suitable domain knowledge, a gap between preparation and downstream implementation and use, etc.). Further, if the data preparation step is performed in isolation, it can be difficult to understand how the data is being transformed and how it will impact the performance of the model. Another technical challenge is that proper selection of well-suited data preparation tools typically can benefit from data expertise (e.g., talented data scientists). According to a recent survey, the shortage of data and analytics talent is one of the top barriers to realizing the full potential of data-driven decision-making. Hence, lack of sufficient expertise may result in improper selection and tuning of the data preparation steps.

Automated data cleaning typically comprises two main steps, namely, error detection and data repair. Error detection refers generally to the process of traversing the dataset searching for erroneous data samples, and it can be a one-shot process or an iterative process. Data repair refers generally to the process of replacing erroneous data samples with generated values close to "ground truth." Instead of replacing erroneous samples, some data repair strategies (including, for example, a duplicates cleaner approach and some outlier repair methods) instead opt to omit those samples. Most existing automated error detection methods unfortunately are not able to recognize the error type. They simply make a binary decision of "dirty" or "clean" for each data instance. In such cases, the task of repairing the dirty instances becomes challenging. One workaround is to harness several repair tools to find the best repair candidate. For instance, the outlier in the "age" column in FIG. 1 can be replaced with the mean, median, or mode of the other values in that column. Moreover, ML-based imputation methods can be used to generate other repair candidates. But the question remains how to select the best repair values from among these candidates. These repair tools do not guarantee the estimation of appropriate values, let alone the "real" values of the dirty instances. Therefore, there are technical challenges relating to how to select the best repair values, and consequently the best repair tool, in ML pipelines.

There are a number of ML-oriented data cleaners currently available. For instance, CPClean, BoostClean, and ActiveClean focus on repairing data in light of the downstream ML models. CPClean incrementally cleans a training set until it is certain that no more repairs can possibly change the model predictions. BoostClean treats data cleaning as a boosting problem. BoostClean uses knowledge of labels applied to data to adaptively select from a set of repair actions to maximize prediction accuracy. Through a combination of boosting and feature selection, a good series of cleaning operations can be generated to improve the performance of the predictive model. ActiveClean is similar in that is mainly employed for models with convex loss functions. In machine learning, a loss function is a function that measures the difference between the predicted output of a model and the actual output. One goal of training a model is to find parameters that minimize the loss function. A loss function is said to be convex if it satisfies the property that any local minimum is also a global minimum. In other words, there are no other points in the function where the value is lower than the minimum. Examples of convex loss functions include mean squared error (MSE) and mean absolute error (MAE), which are used (for example) in regression tasks, and binary cross-entropy and categorical cross-entropy used in classification tasks. In any event, formulates the data cleaning task as a stochastic gradient descent problem, which is an approach oftentimes used in machine learning applications to find the model parameters that correspond to the best fit between predicted and actual outputs. Initially, it trains a model on a dirty training set, where that model is to be iteratively updated until a global minimum is reached. In each iteration, ActiveClean samples a set of records and then asks an oracle to clean them to shift the model along the steepest gradient.

Limited attempts have been made to leverage reinforcement learning (RL) approaches for data preparation. For example, Learn2Clean is an RL-based method that seeks the optimal sequence of data preprocessing tasks for web data to improve a quality performance metric. This method considers a set of most frequently used tools for preparing data, including (1) selecting features, (2) normalizing data, (3) dealing with missing values, (4) dealing with outliers, (5) deduplicating, and (6) consistency checking. To this end, a model-free RL algorithm, referred to as tabular Q-learning, is exploited to improve the predictive performance of a target ML task by selecting a sequence of data preprocessing methods at each iteration and striving to improve the selections over time. During training, the Q-table is updated with respect to the quality of selections made by the RL agent, as the policy of the RL agent is determined with respect to the highest Q-value in the table. This framework uses a model-free RL as indicated above, as the transition probabilities between the states, different preprocessing tasks, and the system dynamics, are not known a priori.

In another study, a deep RL framework was used for discovering optimal data preprocessing steps while training an image classifier. In that study, the framework takes a set of labeled images as input states, and predefined preprocessing transformations (e.g., rotating and flipping) as possible actions that the agent can take. The network policy is modeled using a variant of Deep Q-Network, known as DDQN, which involves convolutional layers and utilizes the max policy for selecting the most probable action. The agent takes an action (e.g., a preprocessing transformation) on an image fed into the framework and proceeds to the next state chosen by the max policy. This process repeats for the current image until the stop action is selected by the policy, at which point the next image is fed in for the same process. After all images in the source have been processed by the RL framework, a classifier is trained on the transformed dataset to obtain a reward.

Current technology-based tools and approach unfortunately have several shortcomings, which hinder their adoption in real-world applications. For instance, ML-oriented data cleaners suffer from added complexity, where an additional method has to be incorporated to select the best repair candidates. Moreover, these cleaning methods are optimized for a certain category of ML tasks. For instance, the scope of CPClean is restricted to KNN models. Accordingly, it will be challenging to exploit these tools with other ML tasks. Thus, there are technical limitations on how such tools can operate and what such tools can operate on. Current RL-based data preparation methods also suffer from high complexity. For instance, Learn2Clean involves the learning of the entire pipeline, which in turn increases time complexity because of the comparatively huge search space in each processing step. This in turn implies high computing complexity and can require a large number of computational resources.

In addition, current ML-oriented cleaning methods lack features for effectively and efficiently preparing data used for training and testing ML models. These missing features include the ability to combine repair candidates from different repair tools. Learn2Clean, for example, lacks such a feature, as only one repair tool is selected for the entire dataset. The ability to generate a learnable module that can be used to prepare the serving data (the production data used in the actual application) in the deployment phase also is missing from current ML-oriented cleaning methods. Most current methods and tools focus on preparing the training and test data, while overlooking the data collected for serving the ML models, even though this data follows the same preparation pipeline as the training and the test data and therefore could benefit from the same or similar techniques. Finally, the study mentioned above that uses a deep RL framework for discovering the optimal data preprocessing steps while training an image classifier is limited to preparing images. Thus, it cannot be employed to deal with tabular or other kinds of data.

Certain example embodiments help address the above-described and/or other concerns. For example, certain example embodiments help address data cleaning issues associated with ML applications, e.g., to provide more accurate ML models and improved tools using such models. More particularly, certain example embodiments aid in (1) orchestrating data cleaning steps in accordance with the downstream ML models and applications, and (2) automating the process of selecting well-suited data cleaning tools. As will be appreciated, downstream machine learning models are those models that are used for a specific task or application after the training process has been completed. They typically operate within a defined framework and perform specialized tasks such as, for example, image recognition, natural language processing, making recommendations for a particular application, etc. The techniques of certain example embodiments may enable users to select well-suited data cleaning tools, even if they lack data science expertise.

Certain example embodiments implement a reinforcement learning (RL) based method. Reinforcement learning is a type of machine learning where an agent learns to make decisions by interacting with an environment. In this technical approach, the agent learns to take actions that lead to positive outcomes, such as receiving a reward or achieving a goal, through a process of trial-and-error. The RL-based method of certain example embodiments helps to automatically select the best data repair tools based on the performance of downstream ML models. Certain example embodiments receive the detected dirty data instances and then select the best repair tools, which leads to improving the overall predictive performance. Moreover, the RL approach of certain example embodiments can combine repair candidates from several repair tools without requiring labeled data. As explained in greater detail below, preliminary results show that the techniques of certain example embodiments outperform a set of baseline repair tools, while also avoiding the need for human intervention.

It will be appreciated that one aspect of certain example embodiments different compared to other existing tools in that certain example embodiments involve treating the data repair mechanism selection process as an RL problem.

One aspect of certain example embodiments relates to techniques that include a learnable module. The approach of certain example embodiments involves a learning network module that can be used to select the most suitable repair tools for cleaning the serving data in the production phase. After training the RL agent, it can be directly used with new data coming from the same distribution as the training data.

Another aspect of certain example embodiments relates to the ability to perform fine-grained repair. Certain example embodiments are capable of combining several repair tools. In certain example embodiments, the granularity level of operation is the row level. Accordingly, certain example embodiments are able to use different repair tools in different rows. Thus, each row can be cleaned with the most suitable repair tool.

Another aspect of certain example embodiments relates to a "configuration-free" approach. That is, certain example embodiments involve an approach to training the RL agent using a small validation set. The validation set can be extracted from the input data. Consequently, certain example embodiments in some instances may eliminate the need for users to independently configure or adjust a component, e.g., based on human input or human-mediated training.

Still another aspect of certain example embodiments relates to a ML task agnostic approach, where certain example embodiments can be used with any downstream ML task, e.g., for regression or classification, without the need for separate training, configuration, or the like.

It will be appreciated that some or all of the above-described and/or other aspects represent technical improvements relative to current technology-based solutions for the reasons set forth above.

In certain example embodiments, a computer-based method of preparing a dirty dataset for use with an application that leverages a machine learned (ML) model is provided. At least some of the data in the dirty dataset including errors. The method comprises: (a) extracting features from the dirty dataset; (b) sampling a batch from the dirty dataset; (c) selecting a set of one or more computer-implemented repair tools from a plurality of available computer-implemented repair tools, provided that the sampled batch is determined to include at least one error; (d) repairing the sampled batch using the selected set of repair tools; (e) training the ML model based on the repaired sampled batch; (f) calculating a feedback metric based on performance of the trained ML model and a validation dataset; (g) adjusting the trained ML model based on the calculated feedback metric; and (h) repeating (b)-(g) such that the selection of the set of repair tools in (c) is modified based on the calculated feedback metric.

According to certain example embodiments, the features may be extracted from the dirty dataset using a term frequency-inverse document frequency (TF-IDF) based algorithm.

According to certain example embodiments, the sampling may be random sampling of records from the dirty dataset.

According to certain example embodiments, the trained ML model may be adjusted by altering weights thereof based on the calculated feedback metric.

According to certain example embodiments, the selecting in (c) may be performed using a neural network that takes as input batches from the dirty dataset and predicts which repair tool(s) from the plurality of available computer-implemented repair tools will best clean the dirty dataset, e.g., with the prediction of the tool(s) from the plurality of available computer-implemented repair tools that will best clean the dirty dataset being used in (d) to repair the sampled batch. In some instances, the feedback metric may be calculated using a policy gradient algorithm. In some instances, the adjusting of the trained ML model in (g) may be based on an estimation of the current loss of the neural network obtained using the validation dataset; and the selection of the set of repair tools in (c) may be modified based on a difference between the current loss of the neural network and a moving average of previous losses.

According to certain example embodiments, the plurality of available computer-implemented repair tools may include a plurality of baseline methods and a plurality of variations of the baseline methods, e.g., with the variations having configured parameters different from their respective baseline methods.

According to certain example embodiments, the ML model may be deployed for the application once the dirty dataset has been cleaned.

In a similar fashion, certain example embodiments relate to a non-transitory computer readable storage medium storing instructions that, when executed by at least one processor, prepare a dirty dataset for use with an application that leverages a machine learned (ML) model, e.g., by performing operations corresponding to the steps described above and herein.

Likewise, certain example embodiments relate to a system for preparing a dirty dataset for use with an application that leverages a machine learned (ML) model, with at least some of the data in the dirty dataset including errors, the system comprising: at least one processor and a memory operably coupled thereto, the at least one processor being configured to execute instructions stored in the memory to perform operations corresponding to the steps described above and herein.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a table showing an example of a dirty dataset comprising categorical and numerical columns, and helping to explain several ways in which poor data quality may be present in a given dataset;

FIG. 5 depicts an example of the inputs and the outputs of the RAS network in accordance with certain example embodiments;

FIG. 6 provides a list of the repair tools, along with variants and configured parameters, that may be used in certain example embodiments;

FIG. 7 is pseudocode implementing certain example embodiments;

DETAILED DESCRIPTION

Certain example embodiments formulate the task of selecting repair tools as a reinforcement learning (RL) problem. The inventor has recognized that RL can play a technically advantageous role in data cleaning tasks that are implemented in data preparation operations when machine learning (ML) models are being trained and/or used.

As will be appreciated from the more detailed description below, the RL approach disclosed herein is different from supervised learning paradigms sometimes used in ML-related technology. In the context of the instant disclosure, for example, trying to implement a supervised learning approach presents certain technical issues. First, supervised learning typically makes use of labeled data to train ML models (e.g., neural networks, random forest, XGBoost, and/or other ML models), but data pipelines (including at least some of those involved herein) oftentimes will lack labeled data. The lack of labeled data thus makes it difficult and sometimes even impossible to train an ML model that otherwise could be involved in selecting appropriate repair tools. The best repair tools for each dataset are not necessarily known a priori. Therefore, it will be difficult to collect labels to train traditional ML models (e.g., because they would have to be provided manually or via some other technique), and a supervised learning approach would encounter problems.

Second, and as another example, the selection process will be isolated from the downstream target model. This implies that the selection of the repair tools will not depend on the performance of the target ML model. In such cases, the selected repair tools may even harm the predictive performance. Thus, even though the data may be repaired and the target ML model may function, the isolation or at least separation of these technical operations may result in the data being repaired poorly or incorrectly, or in a manner that is not helpful to the functioning of the target ML model.

For at least these reasons, it is difficult to adapt a supervised learning approach to designing an efficient and effective data cleaning tool. Certain example embodiments instead employ an RL-based approach to help overcome the above described and/or other technical challenges. In general, RL is a class of algorithms that learn through interacting with the environment. In other words, an RL approach is implemented in connection with a program or other software module (also sometimes called an agent) that learns the best action to carry out that can maximize a numerical "reward" signal. Such actions may influence not only the immediate reward, but also subsequent rewards (including potentially all subsequent rewards). RL thus is differentiated from supervised learning on a technical basis, as the latter involves algorithms that learn from labeled data, whereas the former involves algorithms that are reinforced through (or otherwise refined) by tracking numerical or other reward values over time.

Figure 2A:
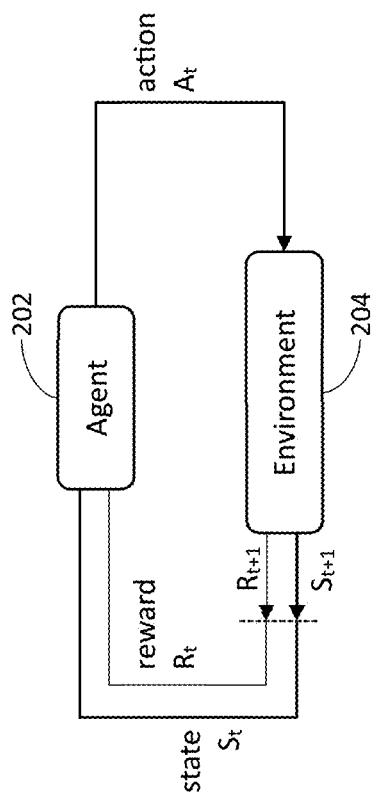
FIG. 2A shows components of a typical RL-based system.

FIG. 2A shows components of a typical RL-based system. As shown in FIG. 2A, the agent 202 is the software program that interacts with the environment 204 and makes decisions. The environment 204 is the external system, with which the agent 202 interacts. The environment 204 can be a physical system or a virtual one. The agent 202 is a set of computer-readable instructions stored to a transitory or non-transitory computer readable storage medium that are performed or executed via processing resources including (for example) at least one processor and a memory. The agent 202 may be implemented on the same or different system as the environment 204. Thus, the environment 204 itself may be its own computing system, including (for example) processing resources like at least one processor and a memory, storage, I/O interfaces, etc.

In FIG. 2A, the state is the representation of the environment 204 at a given time. The action is the decision made by the agent 202 in response to the current state. It can be a physical movement or a control signal, for example. The reward is the feedback signal provided by the environment 204 to the agent 202 in response to its actions. It can be "positive" or "negative," and it is used to guide the agent's learning process. Historical information regarding states, actions, rewards provided, etc., may be saved to storage (e.g., as a part of a log or other data structure including timestamps, an identifier of the agent recording the data, etc.) accessible to the agent 202 and/or the environment 204.

A policy is a strategy that the agent follows to make decisions. It can be deterministic or probabilistic, and it can be represented as a function or a table. Example policies are identified below. A value function is a measure of the long-term expected return of a state or an action. It is used to guide the agent's decision-making process and evaluate its policy. An episode refers to a single sequence of interactions between the agent 202 and the environment 204. As above, this data can be logged or otherwise stored to storage accessible to the agent 202 and/or the environment 204.

Figure 2B:
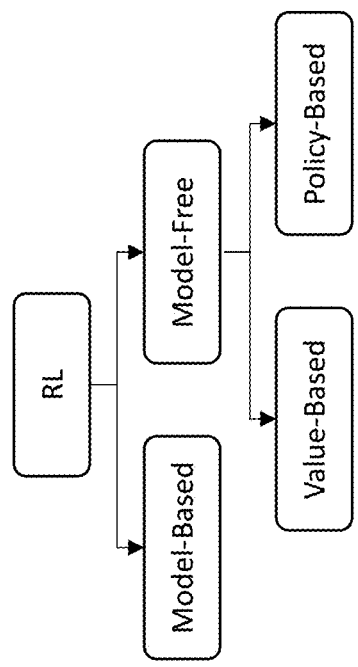
FIG. 2B provides a classification of RL-based algorithms.

FIG. 2B provides a classification of RL-based algorithms. That is, at first, FIG. 2B depicts a classification of RL into model-based and model-free algorithms. In the former category, the agent learns a model of the environment, including the dynamics and reward function. Based on this model, the agent can use the model to plan and evaluate different actions and policies. In this case, the agent may require more data and computational resources to learn the model. In the latter category, the agent does not learn a model of the environment, but instead learns from experience. Specifically, the agent learns directly from the rewards and transitions experienced during interaction with the environment. Accordingly, it may require less data and computational resources compared to those required for the model-based algorithms. In certain example embodiments, the data cleaning task is modeled as a model-free RL problem. This is advantageous because it can be difficult or impossible to generate a model, e.g., given the lack of and/or difficulty generating labeled data. Moreover, the process of selecting the best repair tool will require less data and computational resources with this model-free formulation.

FIG. 2B also shows that model-free algorithms can be further divided into value-based and policy-based algorithms. Value-based RL algorithms (e.g., Q-learning, SARSA, and Deep Q-Network (DQN) approaches) involve estimating a value function, and then using it to derive the policy. Policy-based algorithms (e.g., REINFORCE and actor-critic approaches) involve directly learning the policy function. In certain example embodiments, a policy-based algorithm is implemented. For instance, the REINFORCE algorithm (set forth in, for example, J. Williams, "Simple statistical gradient-following algorithms for connectionist reinforcement learning," Machine Learning, Bd. 8, Nr. 3, 1992, which is hereby incorporated by reference herein) is leveraged in certain example embodiments, as it is more suitable for partially observable environments. In data cleaning, it generally is not known a priori which repair tool will generate a repair value that contributes to the predictive performance. Consequently, the environment underlying certain example embodiments is partially observable. A partially observable environment refers to a situation where an agent (such as a robot or AI system) has limited information or sensory input about the state of its surroundings. In such cases, the agent makes decisions based on incomplete or uncertain information, which can impact its ability to effectively navigate the environment and achieve its goals. As a result, the REINFORCE algorithm serves as an efficient and suitable algorithm for the data cleaning task.

Figure 3:
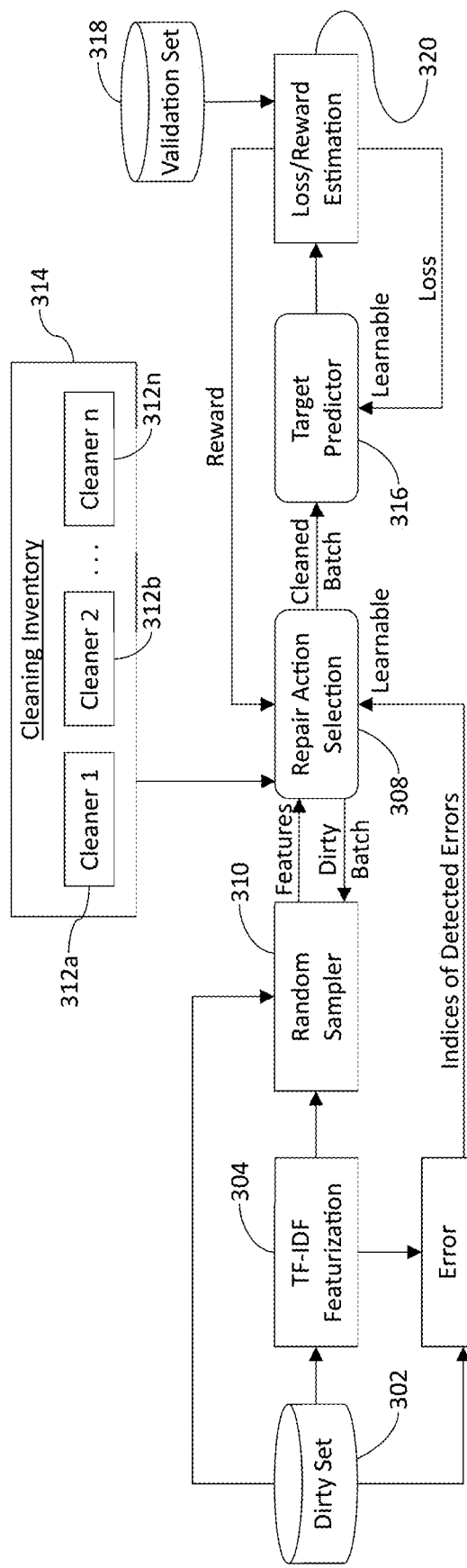
FIG. 3 is a block diagram demonstrating an example architecture and components that may be used with certain example embodiments.

Certain example embodiments find the best repair tools whose output can enhance the predictive performance of the target models. FIG. 3 is a block diagram demonstrating an example architecture and components that may be used with certain example embodiments. A dirty dataset 302 is given as input. The dirty dataset 302 may be stored locally or remotely, e.g., on a non-transitory computer readable storage medium, and it may be accessed directly, via an API, web service calls, etc. A set of TF-IDF features are extracted from the input dirty dataset 302 via a TF-IDF feature extractor module 304. TF-IDF (term frequency-inverse document frequency) is a method for featurizing text data used in natural language processing (NLP) and information retrieval (IR) tasks. It is used, for example, to represent the importance of a word or term in a document or set of documents. Such features are used to automatically detect errors in a semi-supervised manner via an error detector 306. Although the TF-IDF approach commonly is used with NLP, certain example embodiments leverage its approach for use with RL-based technology applicable to a wide variety of different kinds of data in a variety of different domains (e.g., as will become yet clearer based on the simulations reported on below). Although TF-IDF is used in certain example embodiments, other feature extractors may be used in different example embodiments. For instance, the techniques disclosed herein may be used in connection with Word2vec and metadata extractors; however, it was found that TF-IDF provided the best improvements in predictive accuracy in terms of those tested examples.

The extracted features are used as an input to a repair action selection (RAS) module 308. As will explained in greater detail below, the repair action selection module 308 is a module that involves a deep neural network and a reward signal generated by the target ML model, used to make an accurate selection of the repair tools. A random batch is sampled from the dirty dataset 304 via a random sampler module 310. A random sampler in general implements a method for selecting a random subset of data from a larger dataset, and random samplers are commonly used in machine learning and statistics to randomly select a sample of data for training, testing, and validation purposes. If the randomly sampled batch includes dirty samples as determined by the error detector 306, the RAS module 308 randomly selects a set of repair tools (e.g., one or more cleaners 312a-312n from the available cleaner inventory 314) to be applied. These cleaners 312a-312n may be stored as bundles of executable program logic, and they may be retrieved or accessed when they are to be run by the agent. It will be appreciated that certain example embodiments may first check for dirty records within a sampled batch. If there are no dirty records therein, the repair step will be bypassed for that batch and that batch instead will be used more directly to train the target ML model.

The output of this stage is a cleaned batch of data. The cleaned batch is then used to train the target model/predictor 316, e.g., in connection with classification or regression models. After training, the reward relative to a clean validation set 318 is calculated via a loss/reward estimation module 320 and a validation dataset 318. The validation dataset 318 is a set of data that is used to evaluate the performance of a model during the training process. A validation dataset in general can be used to tune the hyperparameters of the model and to prevent overfitting (which is a known technical challenge in this technology space). In certain example embodiments, the validation dataset 318 is used to generate the reward signal (feedback metric) in connection with the loss/reward estimation module 320. Using the obtained reward, the loss of the RAS module 308 is estimated, which can be exploited to update the weights of the RAS module 308. In neural networks (NNs), network weights (or simply weights) refer to the parameters that are learned during the training process. They are used to determine the strength of the connections between the neurons in different layers of the network. Accordingly, the RAS module 308 can make better selection of repair tools 312a-312n in future iterations. This process is repeated until the training data is processed in its entirety.

Figure 4:
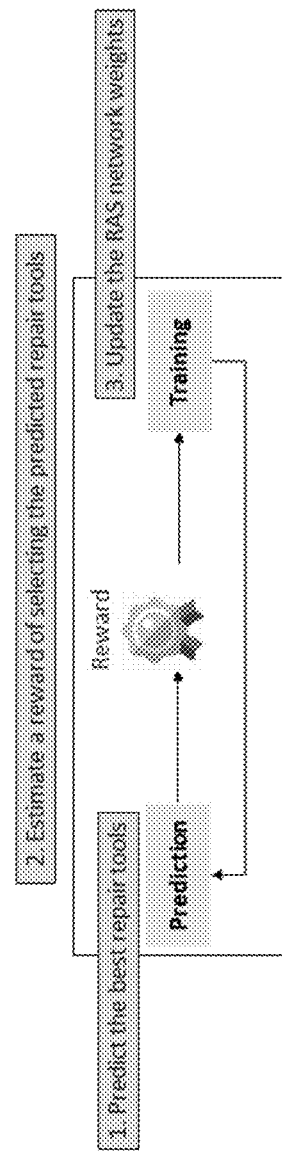
FIG. 4 demonstrates the feedback loop and the steps executed by the RAS module, in accordance with certain example embodiments.

FIG. 4 demonstrates the feedback loop and the steps executed by the RAS module 308, in accordance with certain example embodiments. As shown in FIG. 4, the RAS module 308 predicts the repair tools to be adopted. Based on this selection, the RAS module 308 receives a reward from the target ML model. The reward is exploited in improving the RAS module 308 to make better selections in the subsequent iterations.

Based on the architecture in FIG. 3, the RL components can be defined. For instance, the states are represented by the dirty batches and the feature vectors generated from the input dirty dataset. In this case, each state includes multiple dirty samples to clean at least once. Every training batch is considered as a time step at which the batch is cleaned and trained. The policy is represented by the RAS module that selects the different actions, i.e., repair tools, for a given feature vector. The reward is obtained by the target predictor model on a clean validation dataset. An episode is completed when all samples in a dirty batch are repaired by the repair tools selected by RAS network.

Example Implementation

Details concerning an example implementation are provided below. It will be appreciated that this example implementation is provided to help demonstrate concepts of certain example embodiments, and aspects thereof are non-limiting in nature unless specifically claimed. For instance, the manner in which the repair action is selected, error types, cleaner types, etc., are provided below to ease understanding of the example embodiments described herein and are not limiting unless explicitly claimed.

In certain example embodiments, the RAS module is implemented as a deep neural network optimized to output the index of a repair tool for each dirty sample. Here, the index is indicative of the repair tool to be run on particular data. Certain example embodiments implement a four-layer feedforward neural network with the ReLU activation. The number of hidden units are adjusted with respect to the dimensionality of feature vectors in certain example embodiments. This heuristic is used to systematically define the number of hidden units while preventing overfitting and improving the generalization performance of the model. Overfitting typically occurs when the model fits the training data too closely, which can result in poor performance on new, unseen data. One way to reduce the likelihood of overfitting is to limit the capacity of the model by controlling the number of parameters it has. The number of hidden units in a neural network is one such parameter. When the number of hidden units is too high relative to the dimensionality of the feature vectors, the model may become too complex and overfit to the training data. On the other hand, if the number of hidden units is too low relative to the dimensionality of the feature vectors, the model may not have enough capacity to learn the underlying patterns in the data. By selecting the number of hidden units with respect to the dimensionality of feature vectors, it becomes possible to achieve a balance between model complexity and capacity. For example, if the dimensionality of the feature vectors is high, more hidden units may assist in capturing the underlying patterns in the data. However, if the dimensionality of the feature vectors is low, not as many hidden units may be needed to achieve good performance.

Referring once again to the drawings, FIG. 5 depicts an example of the inputs and the outputs of the RAS network in accordance with certain example embodiments. That is, FIG. 5 shows a set of features (F1, F2, . . . , Fm) that are used as an input to the first layer of the RAS network. The output is represented by the index of a repair tool for each dirty instance (e.g., as shown at the far right to the table to the right). For example, the first row of the dirty batch (to the left) can be repaired using the repair tool whose index is R1, and R2 is suitable for the errors in the second row.

A variety of error detection tools may be used in different example embodiments. For example, RAHA, ED2, Picket, HoloClean, and/or other tools may be used in different example embodiments. Based on testing performed by the inventor, it was found that ED2 offered high detection recall and precision, i.e., on average 99%, with consistent performance over various datasets. Thus, certain example embodiments use at least ED2 in the pipeline to accurately detect the dirty samples. FIG. 3 shows that the example architecture of certain example embodiments involves a set of repair tools or cleaners, which the RAS module selects from to clean the dirty batches. A variety of different repair tools may be used in different example embodiments. For example, statistical imputation (using, for instance, mean and median calculations), ML-based imputation (e.g., using EM, KNN, Bayesian Ridge, MissForest, and/or other approaches), and/or the like may be used in different example embodiments.

In certain example embodiments, the number of repair tools effectively may be increased by considering different configurations of the above-listed and/or repair tools. That is, a set of repair tools may be configured differently to increase the number of effective repair tools usable by certain example embodiments. For instance, five KNN repair tools have been used by considering different values of the number of neighbors "k". FIG. 6 provides a list of the repair tools, along with variants and configured parameters, that may be used in certain example embodiments. In FIG.

6, the baseline methods are the repair tools, and example configurable parameters are shown with different example configurations set.

After selecting the error detection tool and the set of repair tools, the reward and loss functions used to update the RAS network are defined. The loss is used to adjust the weights of the RAS network, whose output $y_{pred}$ can be expressed as follows:

$$y_{pred} = h(s_i, c_j) = \begin{bmatrix} p_{11} & \cdots & p_{1m} \\ \vdots & \ddots & \vdots \\ p_{n1} & \cdots & p_{nm} \end{bmatrix}$$

where n, m denote the number of data samples in a batch and the number of repair tools, respectively. The term $p_{ij}$ represents the probability that the sample $s_i=(x_i, y_i)$ is cleaned using the repair tool $c_j$. Because ground truth labels of the predictions generated by the RAS network typically will not be available, a gradient descent-based optimization becomes comparatively unsuitable. As is known, gradient descent optimization refers to an optimization algorithm used to minimize a function (typically a cost function) used is machine learning and deep learning technologies. Because this approach typically will not be feasible, certain example embodiments implement a policy gradient algorithm such as, for example, REINFORCE, to optimize the RAS network. A policy gradient algorithm refers to a class of RL algorithms that optimize the policy directly by adjusting the parameters of the policy function. The policy function, in turn, refers to a function that maps states of the environment to actions, which determine how the agent will behave. Specifically, the reward signal, coming from the target predictor, will be used to estimate the loss of the RAS network. Afterward, the estimated loss and its gradient will be used to update the weights of the RAS network. In certain example implementations, the reward r is estimated as the difference between the current loss $L_{target}(f(x^v), y^v)$, obtained using a validation set, and the moving average of previous losses $L_{movAvg}$, where $x^v$, $y^v$ denote the validation set, and f(.) represents the prediction function of the target predictor. During training, a moving average loss of previous losses with a window size T is used to stabilize the reward function, thus reducing the variance of the obtained loss. In other words, a moving average of previous losses may be used to reduce the variance in certain example embodiments. Other approaches may be used in different example embodiments. Another approach could consider the latest loss, although this approach could lead to high variance due to randomness in the sampling process in some instances. The approach described above is advantageous in that it helps to "smooth" the loss by combining the recent losses using the moving average. Other techniques like exponential smoothing and moving median can be used, but it was found that the moving average approach managed to reduce the variance with minimum overhead and therefore could be advantageous in a number of different scenarios.

After estimating the reward, the loss of the RAS network is calculated. While estimating the loss of the RAS network, it is desirable to achieve a balance between "exploitation" and "exploration." In general, "exploration" refers to the process of exploring new actions in order to gain more information about the environment. "Exploitation," on the other hand, refers to the process of taking actions that are known to be good based on the agent's current knowledge. In certain example embodiments, the RAS network may perform exploration by choosing random repair tools or trying out repair tools that have not been tried before. Conversely, the RAS module may perform exploitation through taking the action (implementing the repair tool) that has the highest expected reward. To achieve a tradeoff between exploitation and exploration, an exploration threshold $\beta_{explore}$ is defined. Based on this exploration threshold, the RAS module is either caused to explore the environment or not. In certain example embodiments, the RAS module will tend to explore new repair tools if the following inequality is satisfied:

$$\beta_{explore} < \text{average } prob \text{ of all selected repair tools} < 1 - \beta_{explore}.$$

If the above inequality is satisfied, the loss of the RAS network is deliberately increased. When the loss increases, the RAS network tends to explore new repair tools. FIG. 7 is pseudocode implementing certain example embodiments. As shown in FIG. 7, inputs include the batch size of the input data, the number of iterations for the RAS network and the target model, the dirty dataset, the validation dataset, the feature vectors, and the moving average window. In each iteration of the RAS network, a dirty batch is samples is retrieved (line 4), and then the samples are cleaned by the selected repair tools (lines 5 and 6). The weights of the target predictor are updated (lines 7 and 8), and the weights of the RAS network are updated (line 10).

Aside from the reward and the loss, certain example embodiments can implement a repair pre-computing technique to greatly reduce the runtime requirements of certain example embodiments. In general, an "epoch" refers to one full pass through the entire training dataset. To estimate the loss of the target model, the repaired data is used to train the target predictor. This implies executing all repair tools on the batches at each epoch. However, the number of epochs can range from 2,000 to 5,000 (for example), e.g., depending on the data at hand. Thus, executing all repair tools in each epoch could greatly increase the runtime requirements (including the time requirements). To combat this technical challenge, certain example embodiments in essence turn the repair operation into an assignment operation. Before training, a list of repaired datasets is generated by each repair tool. Based on the selected repair tools in each batch, the dirty samples are replaced with their repaired versions obtained from the pre-prepared repaired datasets. More particularly, certain example embodiments involve generating a list of repaired datasets for each repair tool before training. Then, based on the selected repair tools in each batch, the dirty samples are replaced with their repaired versions obtained from the pre-prepared repaired datasets. This way, the repair tools do not need to be executed on the batches at each epoch, which reduces the runtime requirements and makes the process more efficient. This approach essentially separates the repair operation from the training operation, making it possible to prepare the repaired datasets ahead of time and enabling them to be used for multiple epochs without needing to execute the repair tools again. This can be particularly useful, for example, in situations where the number of epochs is high, and runtime requirements are a concern. By using this approach, it is possible to estimate the loss of the target model using repaired data more efficiently, which can ultimately lead to better performance and more accurate predictions. In this way, it is possible to sidestep executing the repair tools on the batches at each epoch and provide a technical solution to a technical problem that arises when estimating the loss of a target machine learning model using repaired data. Testing has shown that runtime operations in some instances can be reduced from a few hours to just a few minutes using these techniques.

Figure 8:
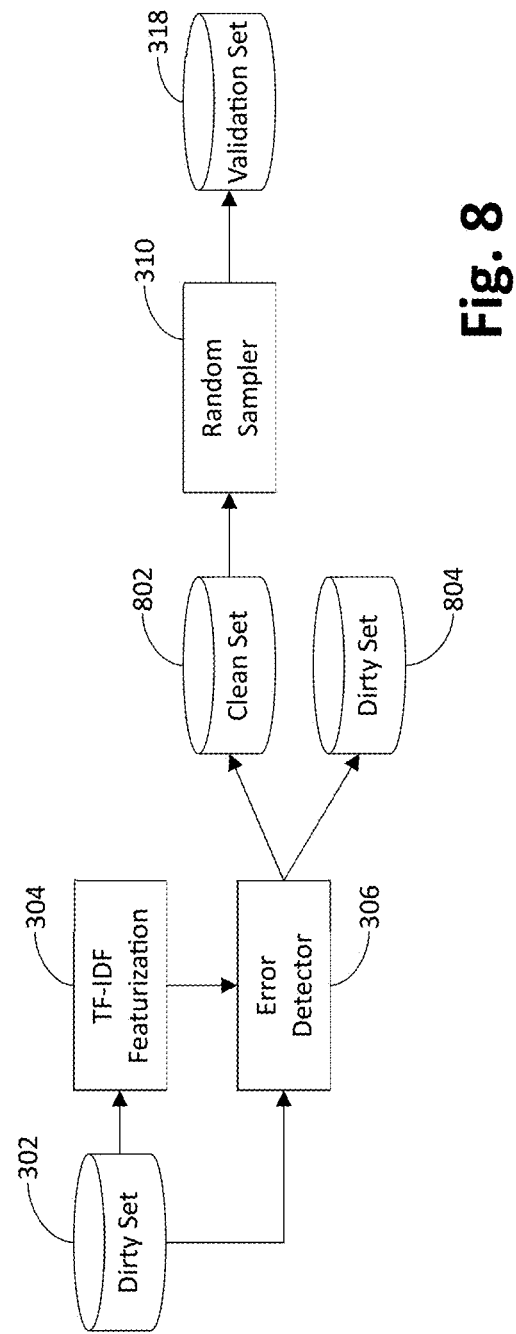
FIG. 8 shows the process of generating validation data in accordance with certain example embodiments.

The validation dataset is used to estimate the reward signal. FIG. 8 shows the process of generating validation data in accordance with certain example embodiments. After detecting errors in the dirty data, the dirty data 302 is split into two fractions, namely, a clean fraction 802 and a dirty fraction 804. The random sampler 310 is used to obtain data samples from the clean fraction. The randomly sampled data represents the validation dataset. In this manner, the validation set 318 can be obtained for each dataset without requiring user intervention in certain example embodiments. In other example embodiments, the validation dataset can be user provided. In still other example embodiments, the validation dataset can include both automatically obtained validated data and user-designated validated data. In certain example embodiments, a user may be asked to confirm whether certain flagged data is suitable for inclusion in the validation set.

Figure 9:
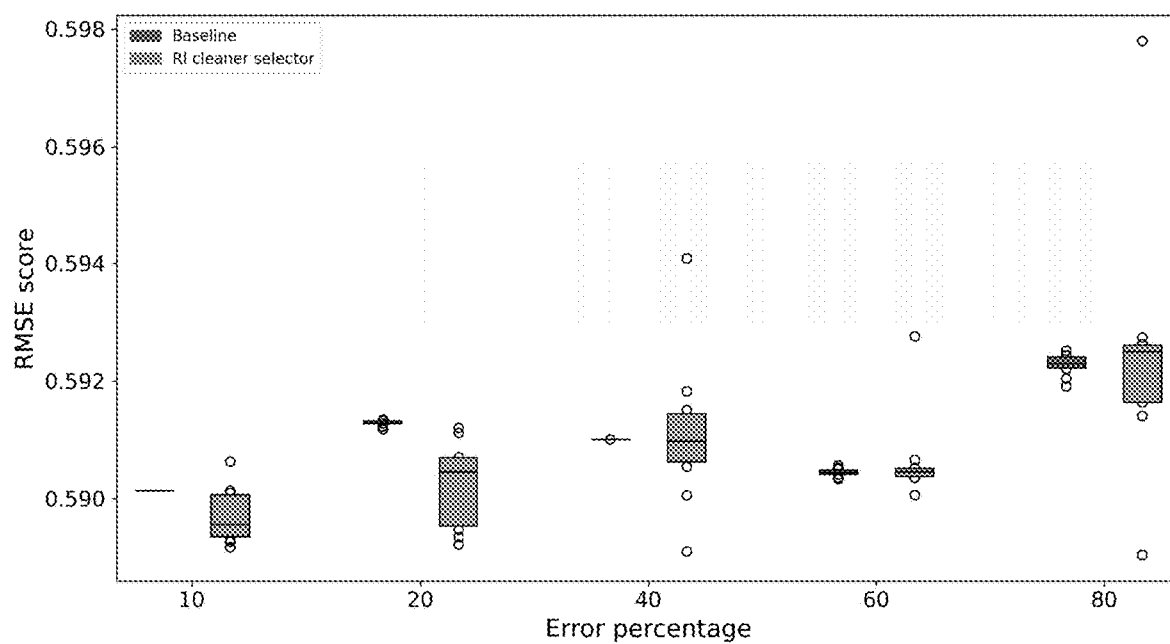
FIG. 9 is a chart showing the performance of a regression model (i.e., the target model) trained on data that has been repaired by the techniques described herein, and the best-performing baseline method.

The inventor has compared results of certain example embodiments with the set of baseline methods identified in FIG. 6 in connection with an experimental setup. The experimental setup used in this comparison involved injecting errors into different data sets. The errors included typos, missing values, and Gaussian noise. In each experiment, the best-performing baseline was compared with the techniques of certain example embodiments. FIG. 9 is a chart showing the performance of a regression model (i.e., the target model) trained on data that has been repaired by the techniques described herein, and the best-performing baseline method. In FIG. 9, the horizontal axis represents the percentage of errors injected into the Wine Quality dataset available from the UCI Machine Learning Repository as the "Wine Quality Dataset." The vertical axis represents accuracy in terms of the room mean square error (RMSE). As can be seen from FIG. 9, even with high error rates, the techniques of certain example embodiments achieved better (or at least comparable) accuracy compared to the best baseline approach. Accordingly, certain example embodiments can outperform the baselines and simultaneously remove the burden of manual selection of the repair tools to be used. Similar results have been found for other classification and regression datasets.

Figure 10:
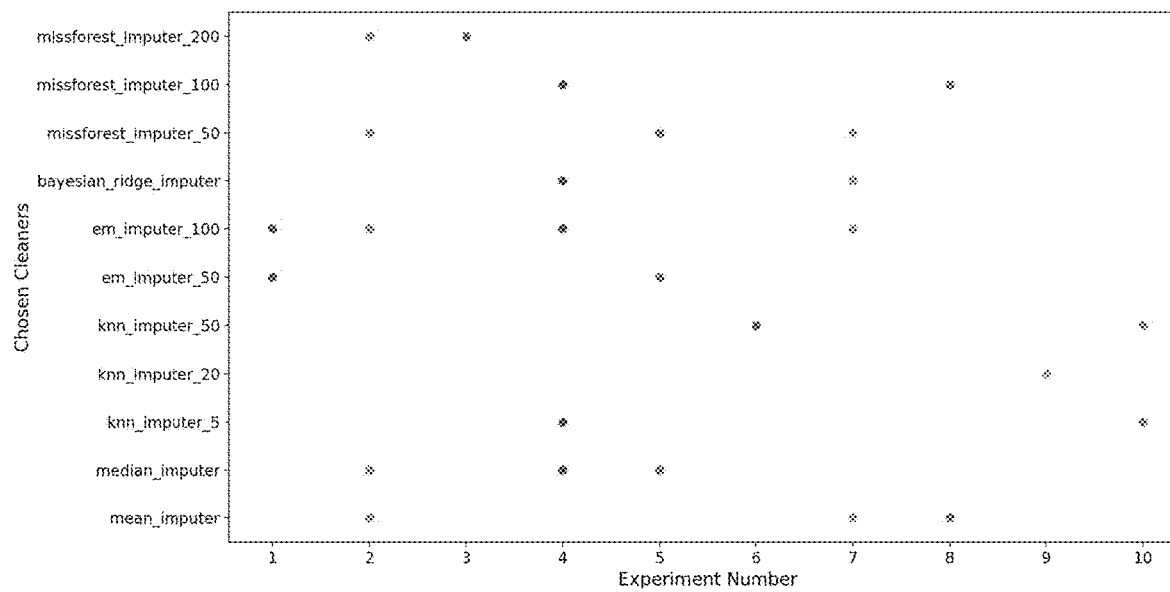
FIG. 10 is a graph demonstrating which repair tools were selected in different experiments with a NASA dataset, available from the UCI Machine Learning Repository as the "Airfoil Self-Noise Data Set."

Aside from predictive accuracy, FIG. 10 is a graph demonstrating which repair tools were selected in different experiments with a NASA dataset, available from the UCI Machine Learning Repository as the "Airfoil Self-Noise Data Set." In FIG. 10, the horizontal axis provides the index of the experiment, and the vertical axis lists the selected repair tools in each experiment. In each experiment, due to random sampling of the training data, the RAS module of certain example embodiments selects a different set of repair tools. Certain example embodiments are able to react to the changes in the error rate by dynamically selecting the best repair tools. Accordingly, the results in FIGS. 9-10 show that the techniques set forth herein can provide high quality repairs together while also outperforming individual known repair tools. The results of these experiments also show that the techniques described herein are able to work with datasets from a variety of different domains including, for example, a medical dataset used for breast cancer diagnosis with binary outputs (benign and malignant), financial data (including a retail sales dataset and the Wine Quality dataset), industrial data (e.g., a smart factory dataset and the Airfoil Self-Noise dataset/NASA dataset), etc. Thus, the techniques disclosed herein provide good results for a wide variety of different types of datasets having a wide variety of different errors.

It will be appreciated that, after the data has been prepared (e.g., once the dirty dataset has been cleaned), the ML model may be trained and deployed. This may involve, for example, making the model accessible to the target application to perform predictions, classifications, or engage in any other appropriate downstream software-mediated task. The trained model may be deployed locally or remotely relative to the agents or other systems performing the data preparation. In certain example embodiments, APIs may be enabled, web services may be made accessible, and/or other production-level tasks may be performed so that the ML model can be used.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer-based method of preparing a dirty dataset for use with an application that leverages a machine learned (ML) model, at least some of the data in the dirty dataset including errors, the method comprising:
   storing, to non-transitory memory, a plurality of available computer-implemented repair tools that include different types of repair tools that are separately executable program code;
   (a) extracting features from the dirty dataset;
   (b) sampling a batch from the dirty dataset;
   (c) selecting, via a neural network, a set of one or more computer-implemented repair tools from a plurality of available computer-implemented repair tools, provided that the sampled batch is determined to include at least one error;
   (d) executing each one of the computer-implemented repair tools of the selected set, with the sampled batch being used as input to the set of one or more computer-implemented repair tools to generate a repaired sampled batch;
   (e) training the ML model based on the repaired sampled batch;
   (f) calculating a first loss metric based on performance of the trained ML model and a validation dataset;
   (g) adjusting the trained ML model based on the first loss metric (h) calculating a second loss metric that is based on a difference between the first loss metric of the ML model and a moving average of previous losses;

(i) updating weights of the neural network based on the calculated second loss metric; and (j) repeating (b)-(i) such that which repair tools are selected via the neural network for the set of one or more computer-implemented repair tools in (c) is modified based on how the weights of the neural network have been updated.

2. The method of claim 1, wherein the features are extracted from the dirty dataset using a term frequency-inverse document frequency (TF-IDF) based algorithm.

3. The method of claim 1, wherein the sampling is random sampling of records from the dirty dataset.

4. The method of claim 1, wherein the trained ML model is adjusted by altering weights thereof based on the first loss metric.

5. The method of claim 1, wherein the selecting in (c) is performed using the neural network that takes as input batches from the dirty dataset and predicts which repair tool(s) from the plurality of available computer-implemented repair tools will best clean the dirty dataset, the prediction of the tool(s) from the plurality of available computer-implemented repair tools that will best clean the dirty dataset being used in (d) to repair the sampled batch.

6. The method of claim 5, wherein the weights of the neural network are updated based on the calculated second loss metric using a policy gradient algorithm.

7. The method of claim 5, wherein the adjusting of the trained ML model in (g) is based on an estimation of the current loss of the MI model obtained using the validation dataset.

8. The method of claim 1, wherein the plurality of available computer-implemented repair tools includes a plurality of baseline methods and a plurality of variations of the baseline methods, the variations having configured parameters different from their respective baseline methods.

9. The method of claim 1, further comprising deploying the ML model for the application once the dirty dataset has been cleaned.

10. A non-transitory computer readable storage medium storing instructions that, when executed by at least one processor, prepare a dirty dataset for use with an application that leverages a machine learned (ML) model, by performing operations comprising:

storing, to non-transitory memory, a plurality of available computer-implemented repair tools that include different types of repair tools that are separately executable program code;

(a) extracting features from the dirty dataset;

(b) sampling a batch from the dirty dataset;

(c) selecting, via a neural network, a set of one or more computer-implemented repair tools from a plurality of available computer-implemented repair tools, provided that the sampled batch is determined to include at least one error;

(d) executing each one of the computer-implemented repair tools of the selected set, with the sampled batch being used as input to the set of one or more computer-implemented repair tools to generate a repaired sampled batch;

(e) training the ML model based on the repaired sampled batch;

(f) calculating a first loss metric based on performance of the trained ML model in connection with a validation dataset;

(g) adjusting the trained ML model based on the first loss metric;

(h) calculating a second loss metric that is based on a difference between the first loss metric of the ML model and a moving average of previous losses, (i) updating weights of the neural network based on the calculated second loss metric; and (j) repeating (b)-(i) such that which repair tools are selected via the neural network for the set of one or more computer-implemented repair tools in (c) is modified based on how the weights of the neural network have been updated.

11. The non-transitory computer readable storage medium of claim 10, wherein the selecting in (c) is performed using the neural network that takes as input batches from the dirty dataset and predicts which repair tool(s) from the plurality of available computer-implemented repair tools will best clean the dirty dataset, the prediction of the tool(s) from the plurality of available computer-implemented repair tools that will best clean the dirty dataset being used in (d) to repair the sampled batch.

12. The non-transitory computer readable storage medium of claim 11, wherein the adjusting of the trained ML model in (g) is based on an estimation of the current loss of the ML model obtained using the validation dataset.

13. A system for preparing a dirty dataset for use with an application that leverages a machine learned (ML) model, at least some of the data in the dirty dataset including errors, the system comprising:

at least one processor and a memory operably coupled thereto, the at least one processor being configured to execute instructions stored in the memory to perform operations comprising:

storing, to non-transitory memory, a plurality of available computer-implemented repair tools that include different types of repair tools that are separately executable program code;

(a) extracting features from the dirty dataset;

(b) sampling a batch from the dirty dataset;

(c) selecting, via a neural network, a set of one or more computer-implemented repair tools from a plurality of available computer-implemented repair tools, provided that the sampled batch is determined to include at least one error;

(d) executing each one of the computer-implemented repair tools of the selected set, with the sampled batch being used as input to the set of one or more computer-implemented repair tools to generate a repaired sampled batch;

(e) training the ML model based on the repaired sampled batch;

(f) calculating a first loss metric based on performance of the trained ML model in connection with a validation dataset;

(g) adjusting the trained ML model based on the first loss metric;

(h) calculating a second loss metric that is based on a difference between the first loss metric of the ML model and a moving average of previous losses;

(i) updating weights of the neural network based on the calculated second loss metric; and (j) repeating (b)-(i) such that which repair tools are selected via the neural network for the set of one or more computer-implemented repair tools in (c) is modified based on how the weights of the neural network have been updated.

14. The system of claim 13, wherein the features are extracted from the dirty dataset using a term frequency-inverse document frequency (TF-IDF) based algorithm.

15. The system of claim 13, wherein the sampling is random sampling of records from the dirty dataset.

16. The system of claim 13, wherein the trained ML model is adjusted by altering weights thereof based on the first loss metric.

17. The system of claim 13, wherein the selecting in (c) is performed using the neural network that takes as input batches from the dirty dataset and predicts which repair tool(s) from the plurality of available computer-implemented repair tools will best clean the dirty dataset, the prediction of the tool(s) from the plurality of available computer-implemented repair tools that will best clean the dirty dataset being used in (d) to repair the sampled batch.

18. The system of claim 17, wherein the weights of the neural network are updated based on the calculated second loss metric using a policy gradient algorithm.

19. The system of claim 17, wherein the adjusting of the trained ML model in (g) is based on an estimation of the current loss of the ML model.

20. The system of claim 13, wherein the plurality of available computer-implemented repair tools includes a plurality of baseline methods and a plurality of variations of the baseline methods, the variations having configured parameters different from their respective baseline methods.

* * * * *